(12) United States Patent
Kohlhoff

(10) Patent No.: US 8,715,088 B2
(45) Date of Patent: May 6, 2014

(54) LEADERBOARD SYSTEM AND METHOD FOR DISPLAYING LOCATION-BASED LEATHERBOARDS WITH REVERSE GEOCODING GPS CO-ORDINATES

(75) Inventor: Andrew Thomas Kohlhoff, London (GB)

(73) Assignee: Sony Computer Entertainment Europe Limited (GB)

( * ) Notice: Subject to any disclaimer, the term of this patent is extended or adjusted under 35 U.S.C. 154(b) by 0 days.

(21) Appl. No.: 13/524,165

(22) Filed: Jun. 15, 2012

(65) Prior Publication Data
US 2012/0322561 A1    Dec. 20, 2012

(30) Foreign Application Priority Data
Jun. 16, 2011    (GB) .................................... 1110194.6

(51) Int. Cl.
  *A63F 9/24* (2006.01)
  *A63F 13/00* (2006.01)
  *G06F 17/00* (2006.01)
  *G06F 19/00* (2011.01)
(52) U.S. Cl.
  USPC ............................................. 463/42; 700/92
(58) Field of Classification Search
  USPC .................................. 463/40–42; 700/91–93
  See application file for complete search history.

(56) References Cited

U.S. PATENT DOCUMENTS

| | | | |
|---|---|---|---|
| 6,609,005 B1* | 8/2003 | Chern | 455/457 |
| 6,840,861 B2* | 1/2005 | Jordan et al. | 463/42 |
| 6,986,712 B1* | 1/2006 | Ogawa | 463/42 |
| 7,614,944 B1 | 11/2009 | Hughes et al. | |
| 2002/0010697 A1* | 1/2002 | Marshall et al. | 707/10 |
| 2003/0093168 A1* | 5/2003 | Nagaoka | 700/91 |
| 2003/0228908 A1* | 12/2003 | Caiafa et al. | 463/42 |
| 2004/0180713 A1* | 9/2004 | Eklund | 463/17 |
| 2006/0089200 A1* | 4/2006 | Twerdahl | 463/42 |

(Continued)

FOREIGN PATENT DOCUMENTS

WO    0174037 A2    10/2001

OTHER PUBLICATIONS

"Inside Social Games: Turning Exercise Into Games with iPhone Title Skimble". [dated Jun. 9, 2010], [online], [retrieved on Jan. 26, 2013], <URL:http://www.insidesocialgames.com/2010/06/09/turning-exercise-into-games-with-iphone-title-skimble/>. 3 pages.*

(Continued)

*Primary Examiner* — Milap Shah
(74) *Attorney, Agent, or Firm* — Lerner, David, Littenberg, Krumholz & Mentlik, LLP

(57) ABSTRACT

An entertainment device comprises means to obtain a set of GPS co-ordinates describing the location of the device, means to initiate reverse geocoding responsive to the co-ordinates to obtain a hierarchy of geographical names, means to request, from a leaderboard server, leaderboard data corresponding to one of the hierarchy of geographical names, and means to display some or all of the leaderboard. A leaderboard server comprises means to host multiple leaderboards either linked together according to a geographical hierarchy or each associated with a geographical name, means to obtain a hierarchy of geographical names generated by reverse geocoding, means to identify one or more leaderboards either in a hierarchical sequence corresponding to one or more of the geographical names or whose associated geographical name matches one or more of the geographical names in the hierarchy of geographical names, and means to provide to the client data of selected identified leaderboards.

14 Claims, 6 Drawing Sheets

(56) References Cited

U.S. PATENT DOCUMENTS

| | | | |
|---|---|---|---|
| 2006/0217198 A1* | 9/2006 | Johnson | 463/40 |
| 2008/0113805 A1* | 5/2008 | David et al. | 463/42 |
| 2009/0258710 A1* | 10/2009 | Quatrochi et al. | 463/43 |
| 2010/0075732 A1* | 3/2010 | Haley et al. | 463/17 |
| 2011/0065511 A1* | 3/2011 | Mahan et al. | 463/40 |
| 2011/0072020 A1* | 3/2011 | Ngo et al. | 707/739 |
| 2012/0253653 A1* | 10/2012 | Burroughs et al. | 701/300 |
| 2012/0282995 A1* | 11/2012 | Allen et al. | 463/22 |
| 2013/0013094 A1* | 1/2013 | Parks et al. | 700/92 |
| 2013/0017872 A1* | 1/2013 | Parks | 463/9 |

OTHER PUBLICATIONS

"Firi Games: Pheonix Patch Notes" via The Way Back Machine (www.archive.org). [dated May 29, 2011], [online], [retrieved on Jan. 26, 2013]. <URL:http://web.archive.org/web/20110529002445/http://www.firigames.com/phoenix/patchnotes>. 3 pages.*

British Search Report GB 1110194.6 dated Oct. 14, 2011.

* cited by examiner

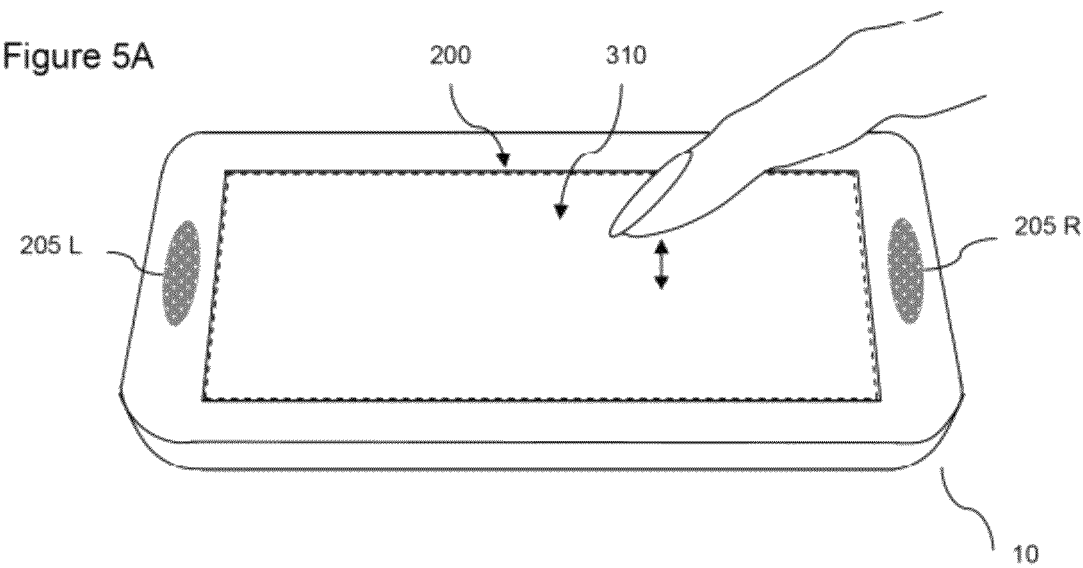
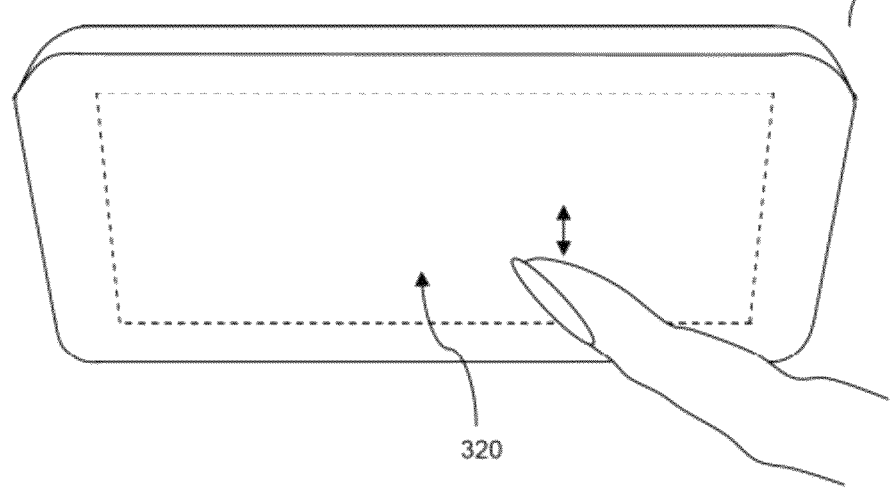

LEADERBOARD SYSTEM AND METHOD FOR DISPLAYING LOCATION-BASED LEATHERBOARDS WITH REVERSE GEOCODING GPS CO-ORDINATES

CROSS REFERENCE TO RELATED APPLICATIONS

The present application claims the benefit of and priority to GB Application No. 1110194.6, filed Jun. 16, 2011, the entire disclosure of which is incorporated by reference herein.

BACKGROUND OF THE INVENTION

1. Field of the Invention

The present invention relates to a leaderboard system and method.

2. Description of the Prior Art

In conventional videogame systems, users can compare their game scores with other users in several ways. A common means of providing a comparison is to generate a so-called leaderboard, which shows the top N ranked players of a game according to some performance metric, such as overall score, shortest lap, achievements in a game level or the like.

Typically the top N players are taken from a global list managed by a network provider associated with the game or with the console upon which the game is run. To make the leaderboard more relevant to the individual, this global list may first be filtered, for example to only select the top N players from a list of friends of a user maintained by the network provider. However, this assumes that a user has a sufficient number of friends playing the relevant game.

Alternatively, the top N players may be taken from a list of players sharing a particular game server or server cluster. Consequently the leaderboard may then correspond to a physical location, such as Europe or the United States, or a virtual location such as 'Server 56'. However, this still does not provide a very personal experience for any particular user.

With the advent of GPS positioning within videogame consoles, a further alternative is to rank users who are currently within a certain distance of each other, to create an ad-hoc local ranking. However, as the point of a leaderboard is to commemorate a good performance, the ephemeral nature of such ad-hoc rankings is unsatisfactory.

Consequently there is scope to improve over the present state of the art.

SUMMARY OF THE INVENTION

In a first aspect, there is provided a method of accessing a leaderboard by an entertainment device.

In another aspect, there is provided a method of providing a leaderboard to a client by a server.

In another aspect, there is provided an entertainment device.

In another aspect, there is provided a leaderboard server.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 5A and 5B are respective schematic diagrams of the front and rear of a portable electronic device according to an embodiment of the present invention.

DESCRIPTION OF THE PREFERRED EMBODIMENTS

A leaderboard system and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In embodiments of the present invention, leaderboards are provided that relate to real-world geographical locations or regions that are meaningful to the user. In embodiments of the present invention, these leaderboards form a hierarchy extending from very small locations, such as individual streets, up through suburbs or districts, boroughs, towns, counties, states, countries, continents and, finally, globally. Such leaderboards typically comprise a list of user IDs and their score or other performance metric relating to a game or some aspect of a game. Typically a subset of this list, such as the top N ranking users by score, is provided for display.

Figure 1:
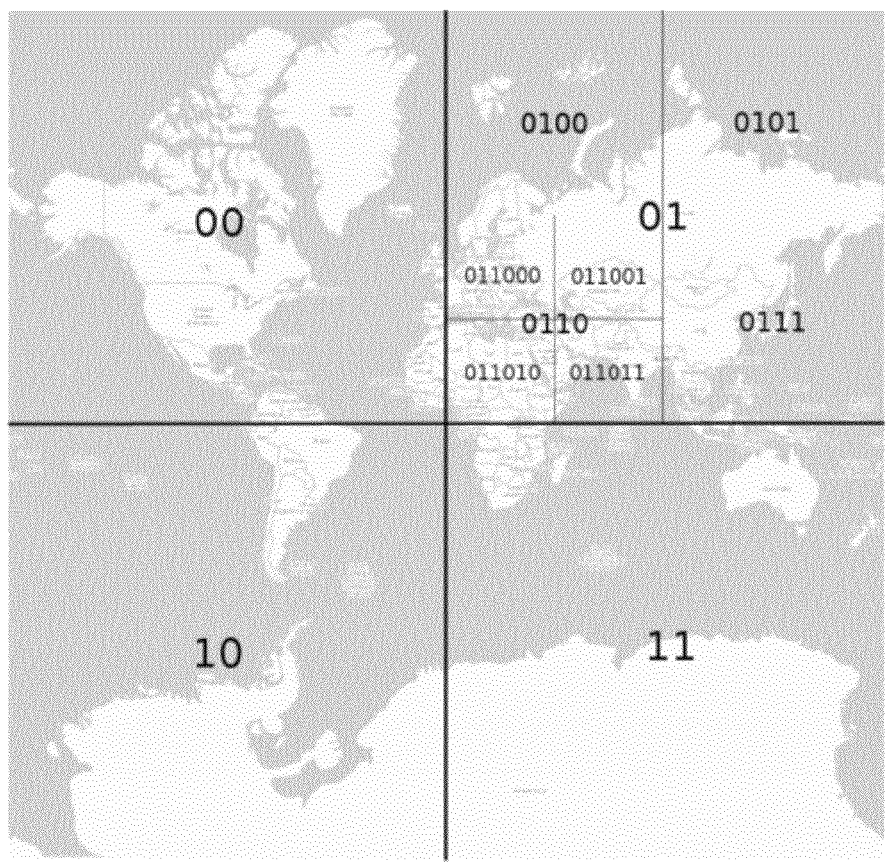
FIG. 1 is a schematic diagram of a scheme to geographically divide the globe.

In principle it is possible to generate such a hierarchical set of leaderboards by generating ever narrower geographical divisions of the planet, in a process known as 'Geohashing'. An example of such a scheme is illustrated in FIG. 1. In this scheme, a two-bit code divides the world into four sections. Within each section, a second two-bit code quarters the section again into four subsections each addressable by a four bit code obtained by concatenating the two two-bit codes. Within each subsection, a third two-bit code generates four sub-subsections, and so on. In this way, regions of the world can be subdivided to arbitrary levels of granularity, where each square region or 'tile' is uniquely addressable by a binary code which embodies the relevant hierarchy of regions within it.

Notably, different regions can be subdivided to different extents, so that, for example, large cities can be subdivided into small tiles, for example in the order of one square kilometre or even less, whilst sparsely populated territory can be represented by much larger tiles. Typically, the geographical divisions can be extended until they contain roughly similar populations of game users of a desired amount.

However, this scheme has disadvantages. The main disadvantage is that the tiles generated by this division process have no physical meaning, and have no direct correspondence with real-world locations. As a result it would be difficult to construct a leaderboard for a particular suburb or town; it would require associating together a set of tiles approximating the geographical coverage of each of those real-world locations separately. This would be laborious and, unless a very high level of division is used, would also only be approximate.

In principle it would be possible instead to tessellate the world using more generally shaped polygons, thereby creating regions that approximate specific geographical areas. However, disadvantageously this would make the addressing process much more complex over successive geographical divisions, and would also require a very large number of polygon definitions to be maintained.

Consequently, in an embodiment of the present invention, a leaderboard system is proposed that uses a reverse geocoding method to provide a hierarchy of meaningful location-based leaderboards.

The reverse geocoding method uses a database of GPS co-ordinates, each having associated metadata. The nature of the metadata or 'tags' is discussed later. Firstly, the system receives as a query an input GPS co-ordinate indicating for example the location of a portable entertainment device. The system then finds the GPS co-ordinate in the database that is closest to the query co-ordinate using a Euclidean distance measure from the query co-ordinate, which for most applications is a sufficiently good approximation of the non-Euclidean elliptical geometry used by GPS co-ordinates. Other suitable distance measures may be known to the skilled person.

The metadata associated with the found GPS co-ordinate then indicates the most geographically narrow location in a hierarchy of real-world locations for the query GPS co-ordinate.

Figure 2:
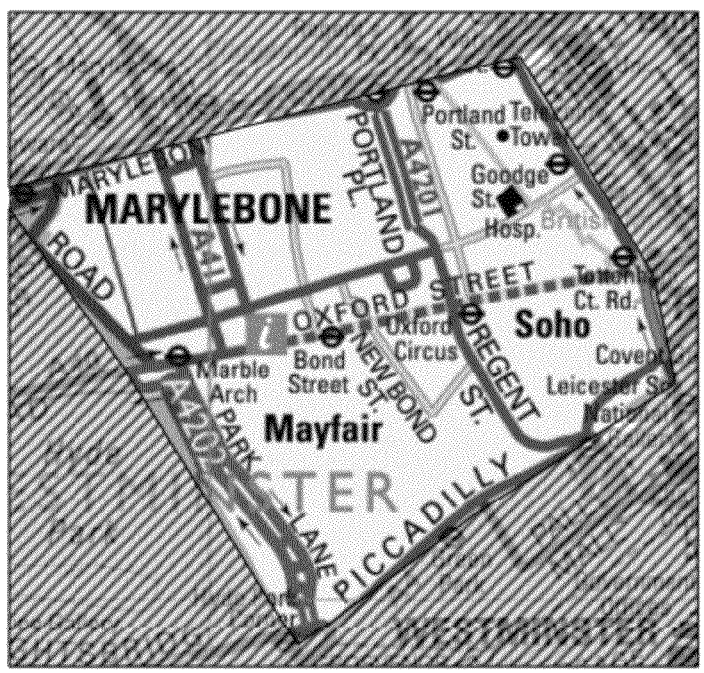
FIG. 2 is a schematic diagram of the London postal region known as 'W1'.

In an embodiment of the present invention, the metadata comprises an ordinary address, such as "10 Great Marlborough Street, W1F 7LP, London, Great Britain". In this case the address implicitly contains a set of hierarchies, which may be listed as follows:

Great Marlborough Street
Great Marlborough Street
W1F 7LP (a post code in the British format that covers some or all of one street)
W1F 7L (a partial postcode defining a broader area that may have a unique name)
W1F 7 (a partial postcode defining a yet broader area that may have a unique name)
W1F (a post code encompassing a one or more suburbs)
W1 (a post code defining a region of London)
W (West London)
London
Great Britain Advantageously, post codes in particular tend to already encode a hierarchy of real-world boundaries and regions. For example, W1F is part of the region known as 'Soho', whilst W1 is part of the region known as 'Westminster'. The region covered by W1 is shown in FIG. 2, and comprises identifiable suburbs such as Marylebone, Mayfair and Soho.

Tables or databases of postcodes and corresponding geographical locations may thus be constructed, as in Table 1 below:

TABLE 1

Top-Level Postcodes for the West London region

| Location | Postcode | Administrative Area |
|---|---|---|
| Portland Street, Regent Street | W1B | Westminster |
| Oxford Street (west) | W1C | Westminster |

TABLE 1-continued

Top-Level Postcodes for the West London region

| Location | Postcode | Administrative Area |
|---|---|---|
| Soho (south east); Chinatown, Soho Square | W1D | Westminster |
| Soho (north west) | W1F | Westminster |
| Harley Street | W1G | Westminster |
| Marylebone | W1H | Westminster |
| Mayfair (south), Piccadilly, Royal Academy | W1J | Westminster |
| Mayfair (north), Grosvenor Square | W1K | Westminster |
| Hanover Square, Savile Row | W1S | Westminster |
| Fitzrovia, Tottenham Court Road | W1T | Camden |
| Marylebone | W1U | Westminster |
| Great Portland Street, Fitzrovia | W1W | Westminster |
| Paddington head district: Paddington, Bayswater, Hyde Park, Westbourne Green, Little Venice (part), Westbourne Green, Notting Hill | W2 | Westminster, Royal Borough of Kensington and Chelsea |
| Acton district: Acton, East Acton, Park Royal, West Acton | W3 | Ealing, Brent Hammersmith and Fulham, Hounslow |
| Chiswick district: Chiswick, Gunnersbury, Turnham Green, Bedford Park | W4 | Hounslow, Ealing |
| Ealing district: Ealing, Park Royal | W5 | Ealing |
| Hammersmith district: Hammersmith, Ravenscourt Park | W6 | Hammersmith and Fulham |
| Hanwell district: Hanwell, Boston Manor | W7 | Ealing, Hounslow |
| Kensington district: Kensington, Holland Park (part) | W8 | Royal Borough of Kensington and Chelsea |
| Maida Vale district: Maida Vale, Little Venice (part) | W9 | Westminster, Camden, Brent, Kensington and Chelsea |
| North Kensington district: North Kensington, Queens Park | W10 | Kensington and Chelsea, Brent, Westminster, Hammersmith and Fulham |
| Notting Hill district: Notting Hill, Holland Park (part) | W11 | Royal Borough of Kensington and Chelsea |
| Shepherds Bush district: Shepherds Bush, White City | W12 | Hammersmith and Fulham |
| West Ealing district: West Ealing, Northfields | W13 | Ealing |
| West Kensington district: West Kensington, Kensington Olympia, Holland Park (part) | W14 | Royal Borough of Kensington and Chelsea, Hammersmith |

The leaderboard system can thus parse any address found in the metadata with reference to such a table in order to create a series of possible hierarchical locations. Given the example address above, this may generate the following hierarchy:

Great Marlbourough Street
Soho
Westminster
West London
London
Great Britain

Additional information may also be used by the system to augment the address and generate intermediate levels in the hierarchy; for example an additional level of 'South East England' may be added for any address from which it can be inferred that the user is in a town such as London, Southampton, Brighton, Maidstone and so on.

Alternatively or in addition, in an embodiment of the present invention, the metadata associated with GPS co-ordinates in the database comprises an explicit hierarchy or data structure that has been pre-computed. For example, the GPS co-ordinate closest to a query co-ordinate of 40.714224N, 73.961452W may contain the following metadata:

Street Name: Bedford Ave
Neighbourhood: Williamsburg
Administrative Area Level 1: Brooklyn
Administrative Area Level 2: Kings
Administrative Area Level 3: New York
State: New York
Country: United States In either case, a resulting hierarchy of real-world geographical regions is obtained in response to the query GPS co-ordinates, and which correspond to the user's current position. It will be understood that the hierarchy represents a series of named locations or regions where each location or region in turn that wholly or partially encompasses the preceding location or region in some physical manner that is locally understood. Notably in embodiments of the present invention it does not contain a spatial representation of a location, such as a tile or polygon of the geohashing type described previously.

A typical database for such reverse geocoding may, for example, comprise a tagged GPS co-ordinate roughly corresponding to the centre of each bottom level (most specific) postcode or zip code in a supported country. Alternatively or in addition it could comprise a tagged GPS co-ordinate for each 100 metres of road in a country. Other strategies for populating a tagged GPS database will be apparent to the skilled person.

Figure 3:
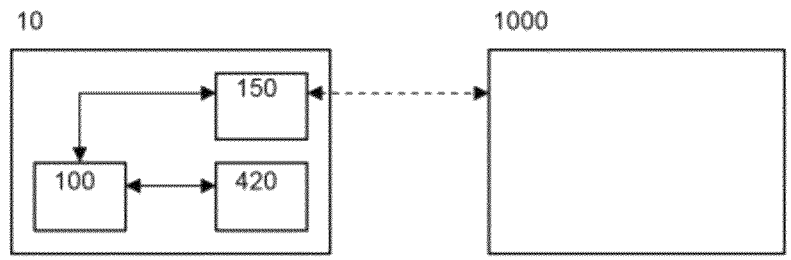
FIG. 3 is a schematic diagram of a client and leaderboard server according to an embodiment of the present invention.

Referring now to FIG. 3, in an embodiment of the present invention a portable entertainment device 10 comprises a CPU 100, a GPS unit 420 and a communications unit such as a 3G cellular unit 150, or a Wi-Fi unit or Ethernet link (not shown). In operation, the CPU runs a game or other application that generates a score or similarly rankable performance data. At a suitable point (for example at the end of a game or in response to unlocking an achievement in a game), the CPU obtains GPS co-ordinates from the GPS unit and initiates a reverse geocoding process as follows.

In one instance, the reverse geocoding process is performed on the portable entertainment device itself using a locally stored database, and the resulting hierarchy of geographical locations is sent to a leaderboard server 1000 via the communications unit. In another instance, the portable entertainment device sends the GPS co-ordinates via the communications unit to the leaderboard server 1000, which performs the reverse geocoding process to obtain the resulting hierarchy of geographical locations itself. In another instance, the leaderboard server relays the GPS co-ordinates to a third party reverse geocoding service provider (not shown) over a network such as the internet, and receives the resulting hierarchy of geographical locations back. In another instance, the portable entertainment device sends the GPS co-ordinates to the third party reverse geocoding service provider (not shown) via the communications unit, and the resulting hierarchy of geographical locations are returned to the portable entertainment device, which then relays them to the leaderboard server. Alternatively in this last instance, the third party provider could send the geographical results directly to the leaderboard server together with an identifier of the portable entertainment device that sent it the GPS co-ordinates.

In addition, the portable entertainment device sends to the leaderboard server a user ID and the score, lap time, achievement or other performance metric that is to be ranked. Where the geographical location data was provided directly to the leaderboard server by a third party, additionally an ID for the portable entertainment device associating it with that location data is also sent.

Other optional information that may be sent from the portable entertainment device to the leaderboard server includes the local time, an indicator of a preferred avatar image of the user, and/or a still image or video clip of the user for display on a leaderboard, captured by the portable entertainment device for example at the point where an achievement was unlocked.

Figure 4A:
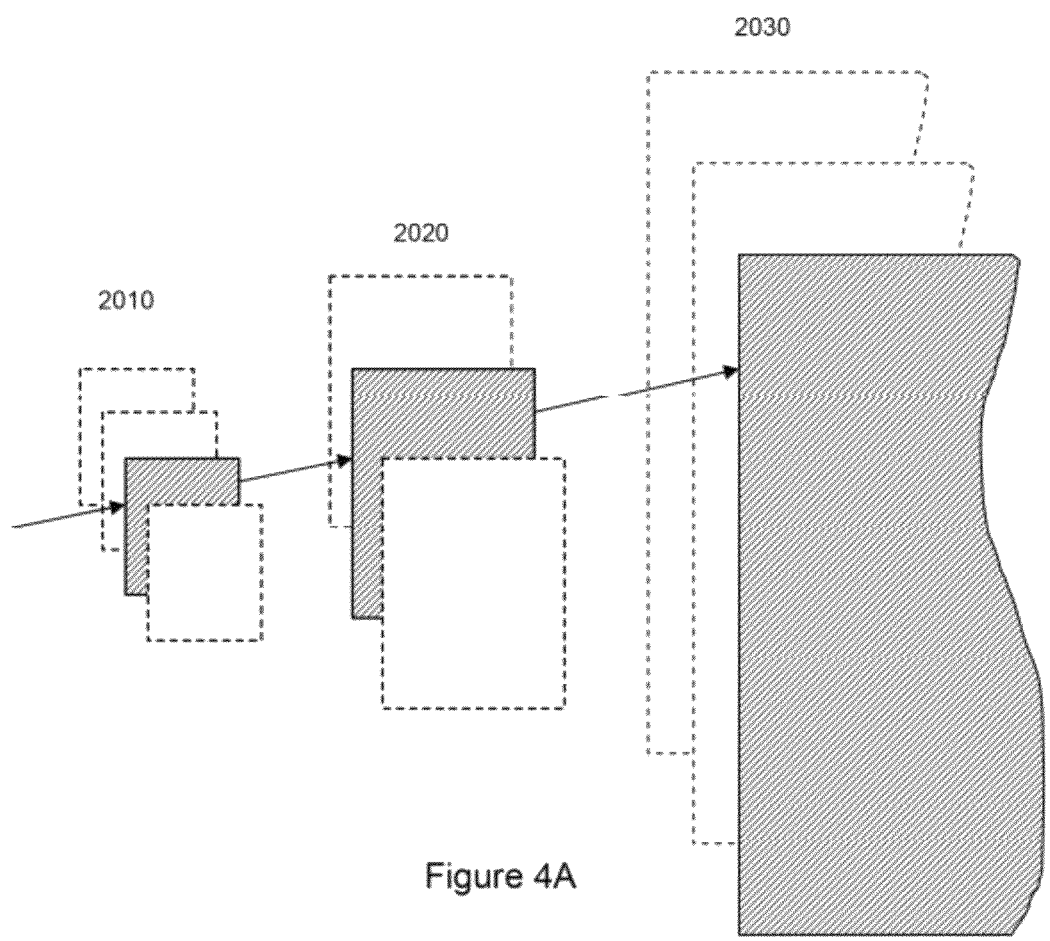
FIG. 4A is a schematic diagram or a hierarchically organised set of leaderboards according to an embodiment of the present invention.
Figure 4B:
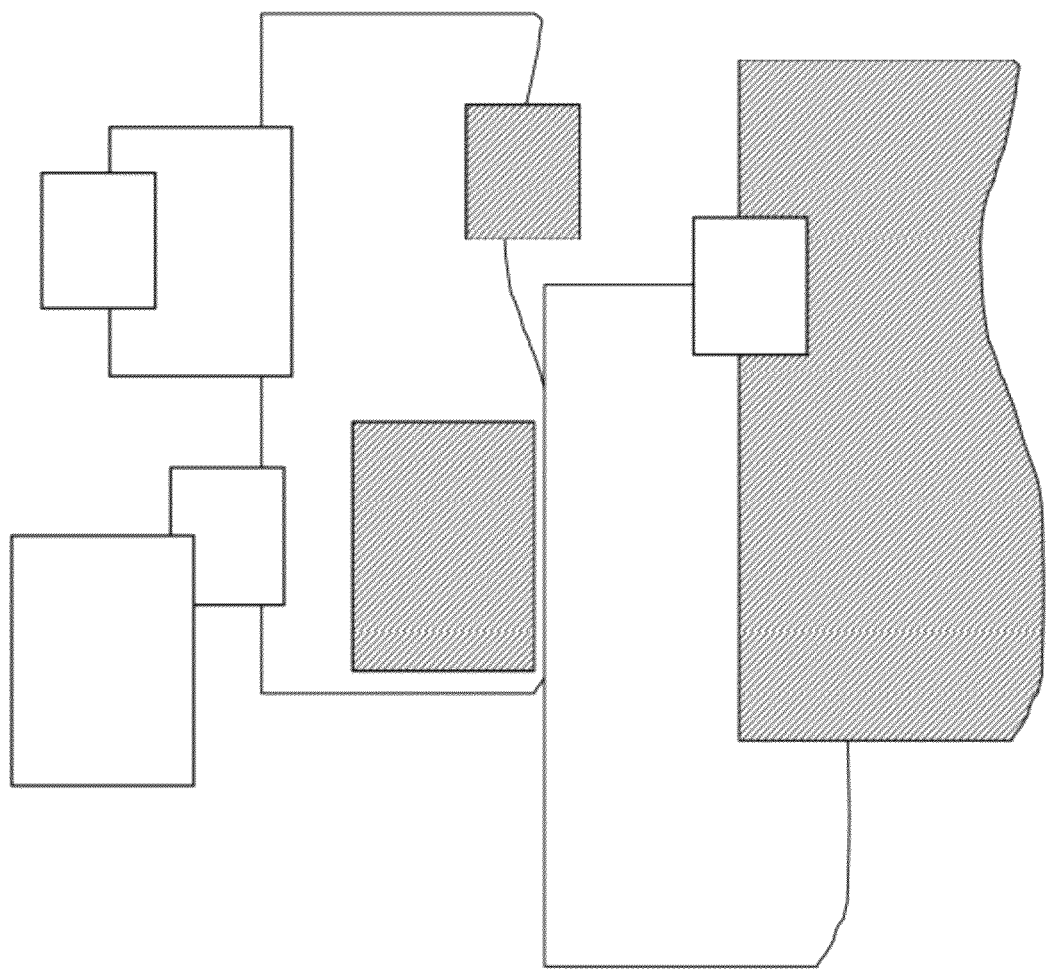
FIG. 4B is a schematic diagram or a non-hierarchically organised set of leaderboards according to an embodiment of the present invention.

Referring now to FIGS. 4A and 4B, the leaderboard server maintains a set of leaderboards relating to the hierarchy of geographical regions.

In an embodiment of the present invention as depicted in FIG. 4A, the leaderboards are hierarchically linked. Using the example above, in this case a first leaderboard is maintained for Williamsburg, and so the user's score, etc are added to this leaderboard. The Williamsburg leaderboard (hatched in FIG. 4A) is part of a set of leaderboards 2010 associated with the Brooklyn leaderboard at the next level of leaderboards in the hierarchy, and so results passed to the Williamsburg leaderboard are automatically forwarded to the Brooklyn leaderboard. Again, the Brooklyn leaderboard (hatched) is part of a set of leaderboards 2020 associated with the Kings leaderboard at the next level of leaderboards in the hierarchy, and so results passed to the Brooklyn leaderboard are automatically forwarded to the Kings leaderboard. The Kings leaderboard (hatched) is in turn part of a set of leaderboards 2030 associated with the New York City leaderboard (not shown) and so results passed to the Kings leaderboard are automatically forwarded to the New York City leaderboard, and so on up the chain to the global leaderboard.

This structure of leaderboards can grow dynamically. For example, when a new game is released, leaderboards for major cities or states may be set up in advance. Then when a user's portable entertainment device submits a result from a new location, the hierarchy of geographical locations associated with the result can be parsed to discover the lowest level leaderboard already available, and from this a new set of dependent leaderboards can be added.

So if the user from the above example was the first person to play the game in New York, this would trigger the creation of the Kings, Brooklyn and Williamsburg leaderboards successively depending from the present New York leaderboard. A subsequent user in a different district of Kings would then trigger the creation of new leaderboards depending from the now existing Kings leaderboard, and so on. In this way the number of leaderboards grows in response to the geographical distribution of usage, and the data required to define the leaderboards is provided by the geographical locations obtained from reverse geocoding user positions.

Alternatively or in addition, in another embodiment of the present invention as depicted in FIG. 4B, some or all of the leaderboards are not hierarchically linked. In this case, each leaderboard is simply given a name that corresponds to a geographical location (the leaderboards corresponding to those in FIG. 4A are hatched by way of example). The user's results are then sent to whichever leaderboards have tags that correspond to locations in the hierarchy of geographical locations obtained from reverse geocoding the user's position. Such leaderboards can be found simply by use of a name search.

Again this unstructured set of leaderboards can grow dynamically. In this case, where no matching name is found for some or all of the hierarchy of geographical locations corresponding to a user's position, then new leaderboard instances can be created for the missing locations, and are given those names and added to the search list. Again some leaderboards can be pre-defined and can have a hierarchical structure; for example country-level leaderboards could be pre-defined and have a hierarchy for continent and global lists (which may not be specified in the hierarchy of geographical locations obtained from reverse geocoding the user's position). In this case, the country leaderboard can pass the user's data up the chain in a similar manner to that described previously.

Notably, the above schemes simplify the submission of user performance metrics to a plurality of geographically meaningful leaderboards. In particular, it avoids the need for example to perform Euclidean distance measuring between user GPS positions and notional positions of leaderboards, with different leaderboards having different threshold inclusion radii, or alternatively (and referring to the initial example of a binary addressable division of the globe), associating different leaderboards with configuration lists of tiles or polygons that cover the actual location that a leaderboard is intended to represent.

In operation, the leaderboard server calculates the ranking of a user on each leaderboard to which a user's performance metric is added. In addition, the updated ranking of that user can be recalculated upon a subsequent query to the leaderboard server by the portable electronic device or by another game server (not shown). In an embodiment of the present invention, the names or other unique IDs of the leaderboards upon which the user has results recorded are stored with a profile of the user based on their unique user ID, so that the leaderboard server can easily query the relevant leaderboards upon request.

In an embodiment of the present invention, the portable entertainment device can request that the leaderboard server sends the status of a particular leaderboard back to the portable entertainment device, so that the top N rankings can be displayed. For example, the portable entertainment device could request the New York City level leaderboard for display.

However, it will be appreciated that for the average user, their position within the leaderboard rankings are likely to be low for many of the largest leaderboards.

Therefore, the portable entertainment device can request a 'relevant' leaderboard from the leaderboard server. The leaderboard server then selects (in the case of the arrangement of FIG. 4A) the highest leaderboard in the hierarchy, or (in the case of the arrangement of FIG. 4B) the most populated leaderboard, in which the user is ranked #M or higher, where M is some predetermined minimum ranking such as #10, #20, #50 or #100, and may be selected either by the leaderboard server, the portable entertainment device, the game designer or the user via a user interface, depending on design preferences. It will be appreciated that M may alternatively be a proportional qualifying value, such as the top 5% of users, and that this absolute or relative value may be different for different leaderboards.

Either way, the user will then see the largest geographically relevant leaderboard (either in terms of geographical size or user population) within which they are performing well. As their performance improves, by this method they will also automatically move up through the geographical hierarchy. So for example, a new player may initially be ranked #12 in Williamsburg, but over time improvements in his performance may result in him being ranked #16 in Kings, or eventually #43 in New York.

By the time the user is #43 in New York, they may also be for example #3 in Kings and #1 in Brooklyn and Williamsburg. Consequently, optionally the leaderboard server may return results for all depending leaderboards that the user also qualifies for, enabling the user to see their ranking at each geographical level leading up to their current position.

Similarly, instead of providing leaderboard details that also list the scores and IDs of other players on a leaderboard, the leaderboard server can return the ranking number of the user for each leaderboard they are included on, so that they can get a concise overview of their performance at different geographical scales.

It will be appreciated that in principle such leaderboards for games can be requested by the portable entertainment device at any time, so that for example the current best ranking for a player can be displayed prior to starting a game, in order to motivate the user to improve their performance.

It will also be appreciated that due to the use of geographically meaningful names for leaderboards, it is comparatively simple to enable a user to request to view a geographically distant leaderboard, or to post a link to their own leaderboard to someone in a different part of the world. In this case, the portable electronic device could send a query to the leaderboard server including the named location, and a name search is performed to return the relevant leaderboard. Similarly, a user could select or input one or more user IDs (for example from a friends list) and request one or more leaderboards relevant to those users. In this case the system may return a leaderboard for each identified user of a similar type to that described above (e.g. the largest leaderboard on which an identified user is ranked in the top M users), but alternatively or in addition may return a leaderboard that contains some or all of the identified users together. Selection of this leaderboard may be subject one or more criteria, such as being the first leaderboard in a geographical hierarchy to contain a predetermined proportion of the identified users, or the smallest leaderboard to contain a predetermined proportion of the identified users above a certain ranking. Other selection strategies will be apparent to the skilled person.

In an embodiment of the present invention, the user can also define a set of GPS co-ordinates as 'home', so that optionally they can continue compete on leaderboards related to their home location regardless of where they happen to be at the time. In this case, the portable entertainment device submits the home GPS co-ordinates instead of the current GPS co-ordinates, and the rest of the system operates transparently as described herein.

For security, GPS co-ordinates can be stored and transmitted in encrypted form. In addition, in an embodiment of the present invention a user can elect to use a different user name for leaderboard rankings to their normal user name. This helps the user to protect their privacy if they have divulged personal details about themselves to other users that, in conjunction with a reasonably detailed knowledge of their location, could be used to identify them. The additional user name would be associated with the user through their profile. Optionally the user can nominate other users (e.g. trusted friends) to receive leaderboards that display their normal user name.

In an embodiment of the present invention, a suitable portable electronic device is the Sony® next generation portable, known as the Playstation® Vita® or PSV.

FIGS. 5A and 5B illustrate an embodiment of a PSV 10. FIG. 5A shows a notional front or top side of the PSV, whilst FIG. 5B shows a notional rear or bottom side of the PSV. The front and rear sides are substantially parallel to each other.

On the front side, the PSV comprises a display 200 and optionally one or more loudspeakers 205L, 205R. A transparent front touch sensitive surface 310 (indicated by the dotted lines) is also provided coincident with the display 200. On the rear side, the PSV comprises a rear touch sensitive surface 320 (indicated by the dotted lines) having similar dimensions to the display 200. The rear touch sensitive surface is positioned so as to be substantially aligned with the display along a central axis normal to the display. The front and rear touch sensitive surfaces and the display thus have similar dimensions and placements on their respective sides of the device. The touch sensitive surfaces also have a similar resolution of touch localisation and are multi-touch.

Figure 6:
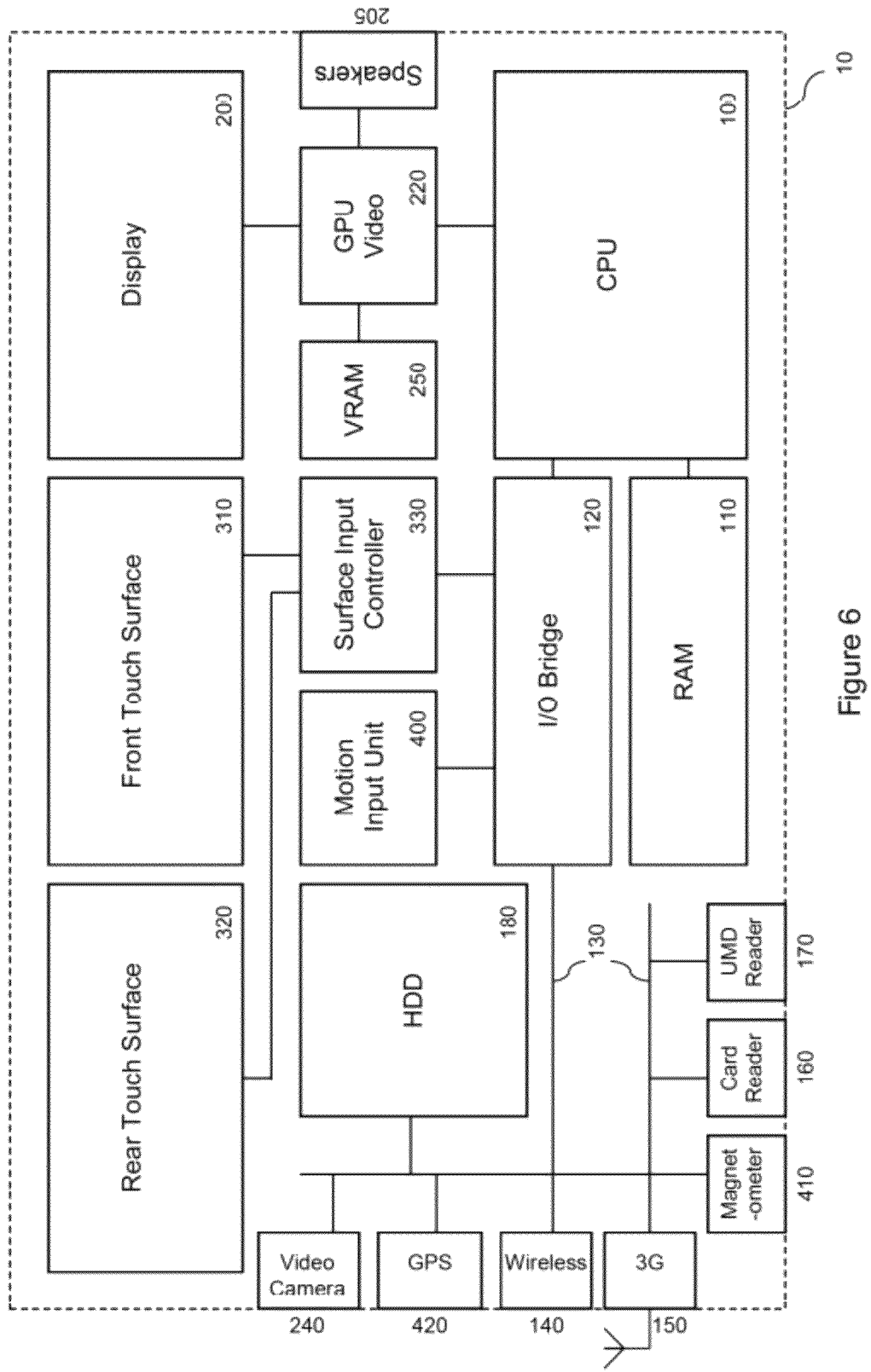
FIG. 6 is a schematic diagram a portable electronic device according to an embodiment of the present invention.

Referring now to FIG. 6, an embodiment of the PSV comprises a central processor (CPU) 100 coupled to random access memory (RAM) 110, and optionally to a read only memory (not shown). In addition the CPU communicates with a graphics processing unit (GPU) 220. The GPU has access to video RAM (VRAM) 250. The GPU outputs audio to loudspeakers 205 and/or to a headphone jack (not shown). The GPU also outputs video information to the display 200. The display is typically a liquid crystal display (LCD) but may be an organic light emitting diode display (OLED) or similar suitable display technology.

In addition, the CPU communicates with an input/output bridge (I/O bridge) 120 that co-ordinates communication with peripheral components both integral to and linkable with the PSV. In an embodiment of the PSV the I/O bridge communicates with a surface input controller 330, which parses inputs from the rear touch sensitive surface and the transparent front touch sensitive surface. The I/O bridge also communicates with a motion input unit 400 comprising one or more micro electromechanical (MEMs) accelerometers and/or gyroscopes, to provide up to six axes of motion input (x, y and z axis lateral movement and roll, pitch and yaw rotational movement). Finally, the I/O bridge communicates with a bus 130, upon which various peripheral devices may be linked, including one or more wireless communication units 140, such as for example WiFi and/or Bluetooth®.

The CPU 100 is typically a multi core processor. Meanwhile, the RAM may be dynamic RAM or may comprise both dynamic RAM and static (flash) RAM units. Likewise, whilst the GPU typically uses dedicated VRAM, alternatively or in addition it may share common RAM with the CPU. Finally, it will be appreciated that the function of the surface input unit may be performed by the CPU itself.

It will be appreciated that whilst not shown in the figures for the purposes of clarity, the PSV comprises power distribution lines to various components and one or more sources of power, such as an input socket (for example a conventional DC power socket, or alternatively or in addition a USB socket). Such an input socket may also be used to charge one or more batteries (also not shown). Such batteries may be user removable or may be sealed in the device. Other components not shown include, for example, an optional microphone.

Additionally, an embodiment of the PSV may comprise one or more additional components, either integrated within the device or connectable to it. The additional components include, but are not limited to, the following.

a) A card reader 160 suitable for reading from and optionally writing to memory cards, such as the Sony® Memory Stick®, or alternatively legacy memory cards such as those used by the Sony® Playstation 2® entertainment device. Such a reader may be integral to the PSV or connect to the bus 130 via a USB connection.

b) A universal media disk (UMD) reader 170 or other optical disk reader (such as DVD or Blu-Ray®), for accessing media and/or game content stored thereon. Such a reader may be removably connectable to the bus 130 via a USB or proprietary connection.

c) A magnetometer 410 for determining compass direction, mounted integral to the PSV either on the bus 130 or as part of the motion input unit 400.

d) A third generation (3G) or other mobile telephony module 150. In an embodiment, the module and aerial are integral to the PSV, and optionally the aerial is shared with or otherwise coupled electromagnetically with other wireless units in the device for the purpose of transmission and reception. Alternatively the module may be removably connectable to the PSV, for example via USB port or a personal computer memory card international association (PCMCIA) slot.

e) A hard disk drive (HDD) 180 integral to the PSV, providing bulk storage for audio/video media, downloaded games, and the like.

f) A GPS receiver 420. Again the GPS receiver may share an aerial with one or more other wireless units (such as WiFi) within the PSV. Map information, where used, may be stored locally at the receiver, or in flash RAM of the PSV, or on an HDD of the PSV.

g) A video camera 240, typically comprising a charge coupled device (CCD) optical sensor and suitable optics for imaging onto the CCD. The resolution of the CCD may for example be 640×480 pixels, but may be any suitable resolution, such as for example 1920×1080 pixels (full HD). In an embodiment the video camera is integral to the PSV, but alternatively may be removably connectable to the bus 130 via a USB or proprietary connection. An embodiment of the PSV comprises two such video cameras 240, forming a stereoscopic pair.

In operation, the CPU accesses an operating system that is resident for example on a ROM, flash RAM or a hard disk. The operating system co-ordinates operation of the various functions of the PSV and presents a user interface to a user of the device. The user interface will typically comprise graphical outputs via the display and touch based inputs, but may also include audio outputs and/or motion-based inputs.

The touch based inputs to the PSV are peculiar to the arrangement of a display on the front of the PSV and a correspondingly positioned touch sensitive surface (or 'panel') on the rear of the PSV. This allows the user to treat the rear panel as a proxy for the display (in other words, address actions and inputs to the rear touch panel as if to the display, and/or point to the panel in order to point to the display). Thus for example, the user can point to icons or other displayed features from apparently underneath the display by touching the rear touch panel at the corresponding position.

It will be appreciated that unlike a laptop touch panel, the rear touch panel has a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the panel can be understood to represent the screen (i.e. act as a proxy). Use of the rear touch panel as a proxy for the display advantageously allows interaction with the graphical output of the device without the user's hand or fingers obscuring the display or marking the display window.

In operation, the operating system or a game application running on the operating system implements those parts of the method described above that relate to the portable electronic device, such as obtaining a set of GPS co-ordinates, obtaining a hierarchy of geographical locations either by internal lookup or via a communication link to a server, and requesting and subsequently displaying a geographically relevant leaderboard to the user.

Figure 7:
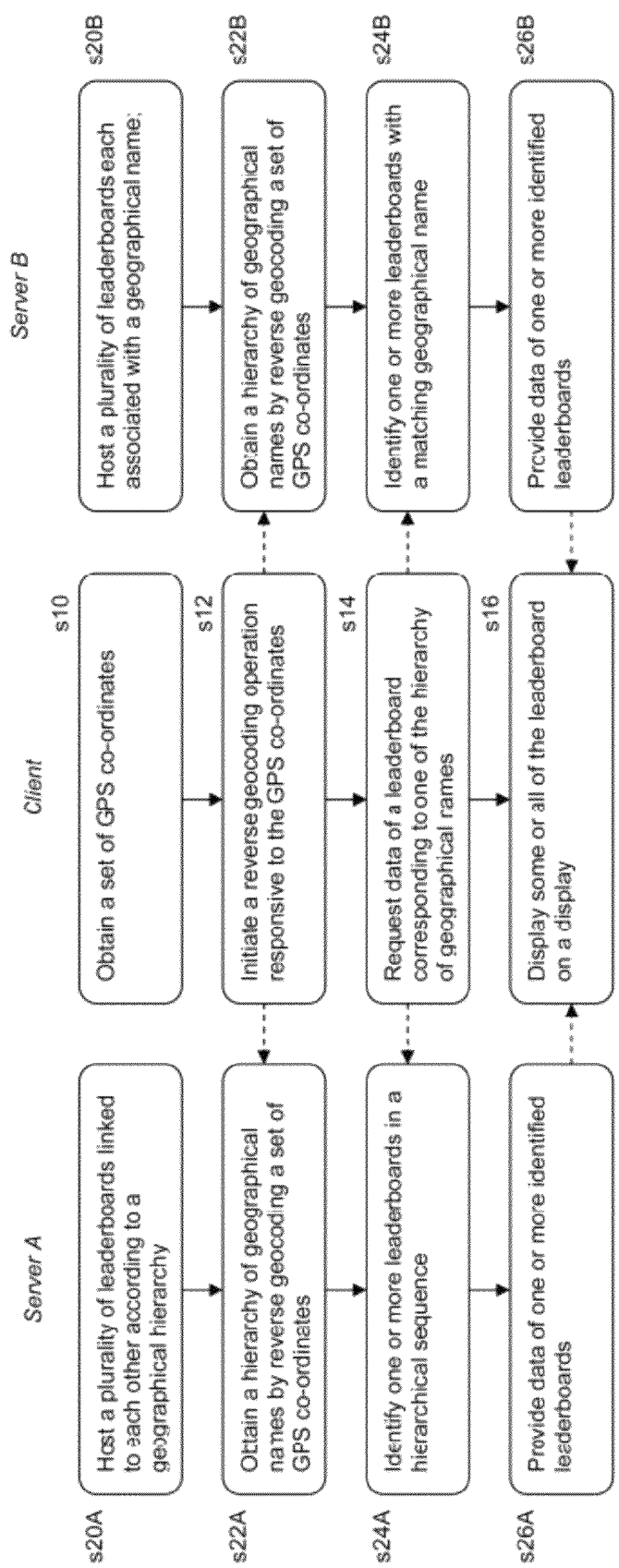
FIG. 7 is a flow diagram of a method of operation for a client and two types of leaderboard server, according to embodiments of the present invention.

Referring now to FIG. 7, the operation of a portable electronic device acting as a client and the operation of two leaderboard servers (server A and server B) having either a hierarchical leaderboard structure or a non-hierarchical leaderboard structure respectively, is described.

In a first client step s10, the portable electronic device obtains a set of GPS co-ordinates describing the location of the entertainment device, for example from the in-built GPS receiver, or from a nearby Wi-Fi hotspot with GPS information.

Meanwhile, in a first server step s20A, server A hosts a plurality of leaderboards linked to each other according to a geographical hierarchy, and in a corresponding first server step 20B, server B hosts a plurality of non-hierarchical leaderboards each associated with a geographical name.

In a second client step s12, the portable electronic device initiates a reverse geocoding operation responsive to the GPS co-ordinates to obtain a hierarchy of geographical names. As noted previously, this could be done internally by the portable electronic device or by request to server A or server B, or to a third party server (not shown). Such possible communication with the servers is shown by dotted arrows.

In a second server step 22A,B, if requested by the client, then either server A or server B as applicable obtains a hierarchy of geographical names generated by reverse geocoding in response to a set of GPS co-ordinates. As noted previously, this could be done internally by the server, the server could request the operation from a third party server (not shown), or the names could be received from the client.

In a third client step s14, the portable electronic device requests from either server A or server B data of at least one leaderboard corresponding to one of the hierarchy of geographical names. It will be appreciated that client steps s12 and s14 could be combined into one request.

In a third server step s24A, server A identifies one or more leaderboards in a hierarchical sequence corresponding to one or more of the geographical names in the obtained hierarchy of geographical names. In a corresponding third server step 24B, server B identifies one or more leaderboards whose associated geographical name matches one or more of the geographical names in the obtained hierarchy of geographical names.

In a fourth server step s26A,B, either server A or server B as applicable provides to the client data of one or more identified leaderboards.

In a fourth client step s16, the client then displays some or all of the or each leaderboard on a display. The display may be integral to the device (as in the PSV) or separate (as with a PS3).

It will be apparent to a person skilled in the art that variations in the above methods corresponding to operation of the various embodiments of the apparatus as described and claimed herein are considered within the scope of the present invention, including but not limited to:

a client uploading a user ID and performance metric to the leaderboard server for inclusion on respective leaderboards corresponding to the hierarchy of geographical names;

when requesting a leaderboard, the client uploading a user ID and requesting the data of the largest leaderboard on which the user ID exceeds a predetermined minimum ranking;

implementing reverse geocoding by detecting the closest location as stored in a database of locations on the entertainment device to the set of query GPS co-ordinates, and generating a hierarchy of geographical names based upon that closest location, either in the client, the leaderboard server or a third party server;

the server receiving a user ID and a performance metric associated with the user ID, and adding the user ID and performance metric to the or each identified leaderboard;

the server receiving a user ID, and providing the data of the largest leaderboard on which the user ID exceeds a predetermined minimum ranking; and the server receiving a plurality of user IDs, and providing the data of a leaderboard on which at least a predetermined proportion of these users are ranked.

Finally, it will be appreciated that the methods disclosed herein may be carried out on conventional hardware suitably adapted as applicable by software instruction or by the inclusion or substitution of dedicated hardware. In particular the client side steps may be carried out by one or more processors on a portable entertainment device such as the PSV, or to an installable entertainment device such as the Sony® Playstation 3® (PS3), whilst the server side steps may be carried out by one or more suitable servers equipped with one or more respective processors and suitable communications means such as an Ethernet link to the internet.

Thus the required adaptation to existing parts of a conventional equivalent device may be implemented in the form of a computer program product or similar tangible object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of accessing a leaderboard by an entertainment device having a global positioning system (GPS) device, the method comprising the steps of:

obtaining, via the GPS device, a set of GPS co-ordinates defining a real-world location of the entertainment device;

initiating a reverse geocoding operation responsive to the set of GPS co-ordinates to obtain a hierarchy of geographical names, the hierarchy of geographical names comprising a set of at least three tiers of real-world identifiable geographical locations;

requesting, from a leaderboard server, data of at least one leaderboard corresponding to at least one of the geographical names associated with the obtained hierarchy of geographical names based on the GPS co-ordinates; and displaying the at least one leaderboard on a display device of the entertainment device.

2. A method according to claim 1, further comprising the step of:

uploading a user ID and performance metric to the leaderboard server for inclusion on respective leaderboards corresponding to the obtained hierarchy of geographical names.

3. A method according to claim 1, in which the step of requesting the data of the at least one leaderboard from the leaderboard server comprises the steps of:
uploading a user ID; and
requesting the data of a largest leaderboard on which the user ID exceeds a predetermined minimum ranking.

4. A method according to claim 1, in which the step of initiating the reverse geocoding operation comprises the steps of:
detecting a closest location, stored in a database of locations on the entertainment device, to the set of GPS co-ordinates; and
generating the hierarchy of geographical names based upon that closest location.

5. A method of providing a leaderboard to a client device having a global positioning system (GPS) device by a server, comprising the steps of:
the server hosting a plurality of leaderboards linked to each other according to a hierarchy of geographical names, the hierarchy of geographical names comprising a set of at least three tiers of real-world identifiable geographical locations;
the server obtaining the hierarchy of geographical names generated by a process of reverse geocoding a set of GPS co-ordinates obtained from the GPS device, the set of GPS co-ordinates defining a real-world location of the client device, and the hierarchy of geographical names being based on the GPS co-ordinates;
the server identifying one or more of the plurality of leaderboards in a hierarchical sequence corresponding to one or more of the geographical names in the obtained hierarchy of geographical names; and
the server providing to the client device data of the one or more identified leaderboards.

6. A method according to claim 5, in which the step of the server obtaining the hierarchy of geographical names via the reverse coding process, comprises:
detecting a closest location, stored in a database of locations on the entertainment device, to the set of GPS co-ordinates; and
generating the hierarchy of geographical names based upon that closest location.

7. A method according to claim 5, comprising the steps of:
receiving a user ID and a performance metric associated with the user ID; and
adding the user ID and performance metric to each identified leaderboard.

8. A method according to claim 5, comprising the steps of:
receiving a user ID; and
providing the data of a largest leaderboard on which the user ID exceeds a predetermined minimum ranking.

9. A method of providing a leaderboard to a client device having a global positioning system (GPS) device by a server, comprising the steps of:
the server hosting a plurality of leaderboards each associated with a geographical name;
the server obtaining a hierarchy of geographical names generated by a process of reverse geocoding a set of GPS co-ordinates obtained from the GPS device, wherein, the obtained hierarchy of geographical names comprises a set of at least three tiers of real-world identifiable geographical locations, and is based on the GPS co-ordinates; and wherein, the set of GPS co-ordinates defines a real-world location of the client device;
the server identifying one or more leaderboards of the plurality of leaderboards whose associated geographical name matches one or more of the geographical names in the obtained hierarchy of geographical names; and
the server providing to the client device data of the one or more identified leaderboards.

10. An entertainment device comprising:
means operable to obtain a set of global positioning system (GPS) co-ordinates defining a real-world location of the entertainment device;
means operable to initiate a reverse geocoding operation responsive to the GPS co-ordinates to obtain a hierarchy of geographical names, the obtained hierarchy of geographical names comprising a set of at least three tiers of real-world identifiable geographical locations, and being based on the GPS co-ordinates;
means operable to request, from a leaderboard server, data of at least one leaderboard corresponding to at least one of the geographical names associated with the obtained hierarchy of geographical names based on the GPS co-ordinates; and
means operable to display the at least one leaderboard on a display device of the entertainment device.

11. An entertainment device according to claim 10 comprising:
means operable to upload a user ID and performance metric to the leaderboard server for inclusion on respective leaderboards corresponding to the obtained hierarchy of geographical names.

12. A leaderboard server comprising:
hosting means operable to host a plurality of leaderboards linked to each other according to a hierarchy of geographical names;
means to obtain a hierarchy of geographical names generated by a process of reverse geocoding a set of global positioning system (GPS) co-ordinates obtained from a GPS device associated with a client device, wherein, the obtained hierarchy of geographical names comprises a set of at least three tiers of real-world identifiable geographical locations, and is based on the GPS co-ordinates, and wherein, the set of GPS co-ordinates defines a real-world location of the client device;
identifying means operable to identify one or more of the plurality of leaderboards in a hierarchical sequence corresponding to one or more of the geographical names in the obtained hierarchy of geographical names; and
providing means operable to provide, to the client device, data of the one or more of the identified leaderboards.

13. A leaderboard server according to claim 12, comprising:
a receiver operable to receive a user ID from the client device; and in which the providing means is operable to provide the data of a largest identified leaderboard on which the user ID exceeds a predetermined minimum ranking.

14. A leaderboard server comprising:
hosting means operable to host a plurality of leaderboards each associated with a geographical name;
means to obtain a hierarchy of geographical names generated by a process of reverse geocoding to a set of global positioning system (GPS) co-ordinates obtained from a GPS device associated with a client device, wherein, the obtained hierarchy of geographical names comprises a set of at least three tiers of real-world identifiable geographical locations, and is based on the GPS co-ordinates, and wherein, the set of GPS co-ordinates defines a real-world location of the client device;
identifying means operable to identify one or more of the plurality of leaderboards whose associated geographical name matches one or more of the geographical names in the obtained hierarchy of geographical names; and
providing means operable to provide, to the client device, data of one or more identified leaderboards.

* * * * *